United States Patent Office 3,661,969
Patented May 9, 1972

3,661,969
[2-(ALKYLAMINO)-1-CYCLOHEXEN-YL]-
CYANOTHIOANILIDES
John P. Chupp, Kirkwood, Mo., assignor to Monsanto
Company, St. Louis, Mo.
No Drawing. Continuation-in-part of application Ser. No.
523,867, Feb. 1, 1966. This application Sept. 8, 1969,
Ser. No. 858,563
Int. Cl. C07c *121/50, 153/05*
U.S. Cl. 260—465 E  7 Claims

ABSTRACT OF THE DISCLOSURE

[2-(alkylamino)-1-cyclohexen-1-yl]thioanilides of the formula

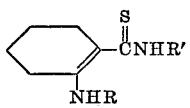

wherein R is alkyl and wherein R' is phenyl, naphthyl, or biphenyl, each having from 1 to 2 cyano substituents. These thioanilides have utility as fungicides.

---

This application is a continuation-in-part of copending application Ser. No. 523,867, filed Feb. 1, 1966, now abandoned.

This invention relates to cyano substituted [2-(alkylamino)-1-cyclohexen-1-yl]thioanilides and to processes for making them.

The [2-(alkylamino)-1-cyclohexen-1-yl]thioanilides of this invention are represented by the formula

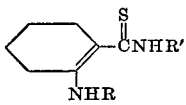

wherein R is alkyl having from 1 to 18 carbon atoms, and R' is a substituted aryl of not more than 18 carbon atoms selected from the group consisting of haloaryl, cyanoaryl and nitroaryl. In the above formula, R can be, for example, methyl, ethyl, n-propyl, isopropyl, n-butyl, isobutyl, sec-butyl, tert-butyl, amyl, hexyl, heptyl, octyl, decyl, dodecyl, octadecyl, and the various homologues and isomeric forms of alkyl having from 1 to 18 carbon atoms. R is preferably lower alkyl (that is methyl, ethyl, propyl or butyl and the various isomeric forms thereof), particularly methyl.

The preferred R' substituted aryl are represented by

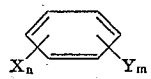

wherein X is halogen (Cl, Br, I and F), Y is selected from the group consisting of nitro and cyano, n is an integer from 0 to 3, m is an integer from 0 to 2 and the sum of n plus m is an integer from 1 to 5.

Representative R' substituted aryl include by way of example o-chlorophenyl, 2-bromonaphthyl, m-chlorophenyl, 2-chloronaphthyl, p-chlorophenyl, 4,4'-dichlorobiphenyl, 2,4-dichlorophenyl, 3,5-dichlorophenyl, 3,4-diiodophenyl, 3,4-difluorophenyl, 3,4-dichlorophenyl, 2,4,6-trichlorophenyl, o-nitrophenyl, m-nitrophenyl, p-nitrophenyl, 2-nitronaphthyl, 4-nitrobiphenyl, 3,4-dinitrophenyl, 2,6-dinitrophenyl, 4,4'-dinitrobiphenyl, 2,4-dinitrophenyl, o-cyanophenyl, 2-cyanonaphthyl, p-cyanophenyl, 2,4-dicyanophenyl, 4-cyanobiphenyl, 3,4-dicyanophenyl, 2,6-dicyanophenyl, chloronitrophenyl, bromonitrophenyl, 2,4-dichloro-6-nitrophenyl, nitrocyanophenyl, chlorocyanophenyl and the like.

The novel thioanilides of this invention are prepared by a process which comprises the thermal rearrangement of 1-alkyl-1-(1-cyclohexen - 1 - yl)-3-(substituted-aryl)-2-thioureas in accordance with the following representative synthesis

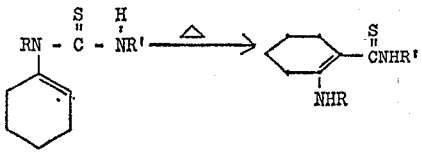

wherein R and R' are as defined above.

The temperature at which the thermal rearrangement of this invention is carried out is critical but only in regard to the lower limit. The thermal rearrangement must be carried out at a temperature above about 35° C. and is preferably carried out at a temperature from about 60° C. to 140° C. Generally, the thermal rearrangement is carried out in the presence of an inert liquid organic medium. It is preferred that the thermal rearrangement be carried out under reflux conditions but such conditions are not required. Inert organic media which can be used in the practice of this invention include by way of example and not limitation hydrocarbons such as benzene, toluene, xylene, cyclohexane, methylcyclohexane, n-heptane and n-hexane, aliphatic and cycloaliphatic ketones such as methyl isopropyl ketone, methyl isobutyl ketone, methyl isoamyl ketone, diisopropyl ketone and cyclohexanone, aliphatic alcohols having 1 to 8 carbon atoms such as methyl, ethyl, propyl, isopropyl, butyl, isobutyl, amyl and hexyl, and organic halides such as carbon tetrachloride, ethylene dichloride and tetrachloroethylene.

The separation of the resulting reaction product from the reaction mixture is readily accomplished. The solvent can be removed from the reaction mixture by conventional means, for example, by stripping or distillation, preferably low temperature vacuum distillation. The product if desired can be purified by any of the conventional means well-known in the art, e.g. fractional distillation under reduced pressure, selective extraction, fractional distillation using a carrier gas, film distillation and recrystallization or any suitable combination of these.

The thioanilides of this invention are liquid or crystalline solid materials which are insoluble in water but somewhat soluble in many organic solvents such as alcohols, ketones, benzene, toluene, xylene, hexane and the like.

The novel compounds of this invention are useful for various purposes such as fire retardants, rust inhibitors, chemical intermediates, rust removers, electroplating additives, phytotoxicants, pesticides, fungicides, tanning agents, gasoline inhibitors and water-insoluble dispersion agents.

The 1-alkyl-1-(1-cyclohexene-1-yl)-3-substituted aryl)-2-thiourea precursors of the thioanilides of this invention are prepared by reacting an N-cyclohexylidene-N-alkyl amine of the formula

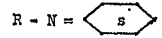

wherein R has the aforedescribed significance with an isothiocyanate of the formula

R'—NCS wherein R' has the aforedescribed significance. The reaction temperature is critical but only in regard to the upper limit employed for specific isothiocyanate reactants. When the isothiocyanate reactant is a substituted aryl selected from the group consisting of haloaryl, cyanoaryl, or nitroaryl thioisocyanate, the reaction temperature is critical and must be maintained below about 35° C. If this process is carried out for a substantial period with these specific isothiocyanate reactants at temperatures above about 35° C., thermal rearrangement of the N-(1-cyclohexen-1-yl)-N'-(substituted aryl)thioureas proceeds according to the following representative synthesis

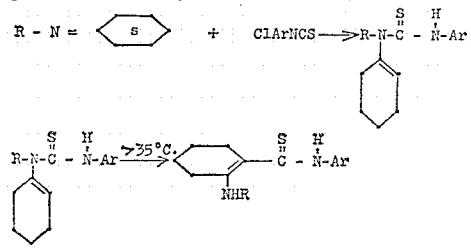

wherein R is as defined above and Ar is a substituted phenyl, or naphthyl or biphenyl. In carrying out this process with a substituted aryl isothiocyanate reactant, the reaction temperature is not critical and temperatures from about 0° C. to about 100° C. are usually employed with temperatures from about 20° C. to about 60° C. being preferred. This process is usually carried out with substantially equimolar amounts of isothiocyanate and amine reactants but an excess of either reactant can be used if desired. The process is advantageously carried out in the presence of an inert organic medium. Inert organic media which can be used in the practice of this invention include, for example, hydrocarbons such as benzene, toluene, xylene, cyclohexane, methylcyclohexane, n-heptane n-hexane, and the like, ethers such as isopropyl ether, n-butyl ether, 1,4-dioxane, isobutyl ether, diethyl ether and the like, aliphatic and cycloaliphatic ketones such as methyl isopropyl ketone, methyl isobutyl ketone, methyl isoamyl ketone, diisopropyl ketone, cyclohexanone and the like, and organic halides such as carbon tetrachloride, n-butyl chloride, methylene dichloride, ethylene dichloride, tetrachloroethylene and the like. The separation of the resulting reaction product from the reaction mixture is readily accomplished. The solvent can be removed from the reaction mixture by conventional means, for example, by stripping or distillation, preferably low temperature vacuum distillation. The product if desired can be purified by any of the conventional means well known in the art, e.g. fractional distillation under reduced pressure, selective extraction, fractional distillation using a carrier gas, film distillation and recrystallization or any suitable combination of these. These N-(1-cyclohexene-1-yl)thiourea precursors are liquid or crystalline solid materials which are insoluble in water but somewhat soluble in many organic solvents such as alcohols, ketones and hydrocarbons such as benzene, toluene, xylene, hexane and the like.

The following examples will illustrate the preparation of these precursors. In these examples, as well as in the specification and appended claims, parts and percent are by weight unless otherwise indicated.

EXAMPLE A

This example describes the preparation of

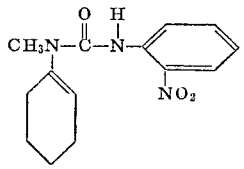

1 - (1 - cyclohexene-1-yl)-1-(methyl)-3-(o-nitrophenyl) urea.

To a solution of 8.2 parts of o-nitrophenyl isocyanate in carbon tetrachloride maintained at room temperature is added about 5.5 parts of N-cyclohexylidene N-methyl amine. An exothermic reaction occurs and the reaction mixture warms to about 30° C. The reaction mixture is cooled to about room temperature (25° C.) and stirred for about 30 minutes. The carbon tetrachloride is stripped off at reduced pressure to recover a reddish-orange solid product which after being re-crystallized twice from ethyl alcohol has a melting point of 120.5–122° C. The assigned structure is confirmed by nuclear magnetic resonance (NMR) spectrum analysis.

Calc'd for $C_{14}H_{17}N_3O_3$ (percent): C, 61.0; H, 6.19; N, 15.3. Found (percent): C, 60.87; H, 6.24; N, 15.61.

EXAMPLE B

This example describes the preparation of

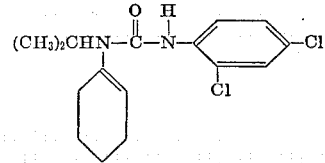

1 - (1 - cyclohexen - 1-yl)-1-(isopropyl)-3-(3,4-dichlorophenyl) urea.

To a solution of 18.8 parts of 3,4-dichlorophenyl isocyanate in benzene maintained at room temperature is added about 13.9 parts of N-cyclohexylidene N-isopropylamine. An exothermic reaction occurs and the reaction mixture warms to about 30° C. The reaction mixture is cooled to room temperature, stirred for about three hours and the benzene stripped off at reduced pressure to recover the oily product. The assigned structure is confirmed by NMR spectrum analysis.

Calc'd for $C_{16}H_{20}N_2OCl_2$ (percent): N, 8.56; Cl, 21.7. Found (percent): N, 7.92; Cl, 19.4.

EXAMPLE C

This example describes the preparation of

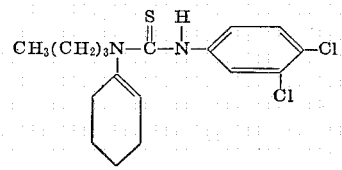

1-(1-cyclohexen-1-yl)-1-(n - butyl) - 3 - (3,4 - dichlorophenyl)-2-thiourea.

To a solution of 20.4 parts of 3,4-dichlorophenyl isothiocyanate in carbon tetrachloride maintained at about 15° C. is added about 15.3 parts of N-cyclohexylidene N-(n-butyl) amine. An exothermic reaction and the reaction mixture warms to about 30° C. The reaction mixture is cooled to about 15° C. and stirred for about one hour. The carbon tetrachloride is stripped off at reduced pressure to recover an oily product which is crystallized from hexane. The solid product amounts to 33 parts and has a melting point of 95–96° C. The assigned structure is confirmed by NMR spectrum analysis.

Cal'd for $C_{17}H_{22}N_2SCl_2$ (percent): C, 57.2; H, 6.26; N, 7.85; S, 8.96. Found (percent): C, 56.58; H, 6.12; N, 7.91; S, 9.21.

EXAMPLE D

This example describes the preparation of

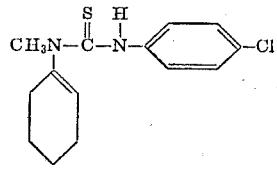

1-(1-cyclohexen-1-yl)-1-methyl-3-(p - chlorophenyl) - 2-thiourea.

To a solution of 11.1 parts of p-chlorophenyl isothiocyanate in carbon tetrachloride maintained at about 20° C. is added about 16.9 parts of N-cyclohexylidene N-methyl amine. An exothermic reaction occurs and the reaction mixture warms to about 30° C. The reaction mixture is cooled to about 20° C. and stirred for about four hours. The carbon tetrachloride is stripped off at reduced pressure to recover a solid product which after being recrystallized from hexane has a melting point of 106–107° C. The assigned structure is confirmed by NMR spectrum analysis.

Calc'd for $C_{14}H_{17}N_2SCl$ (percent): C, 60.0; H, 6.07; N, 10.0; Cl, 12.7; S, 11.4. Found (percent): C, 49.28; H, 6.08; N, 10.10; Cl, 12.97; S, 11.79.

EXAMPLE E

This example describes the preparation of

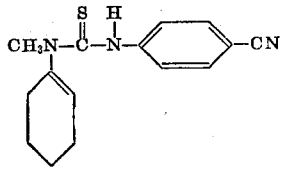

1-(1-cyclohexen-1-yl)-1-(methyl)-3-(p-cyanophenyl) - 2-thiourea.

To a solution of 8.0 parts of p-cyanophenyl isothiocyanate in toluene maintained at about 20° C. is added about 5.6 parts of N-cyclohexylidene N-methyl amine. An exothermic reaction occurs, and the reaction mixture warms to about 30° C. The reaction mixture is cooled to about 20° C. and stirred for about four hours and then permitted to stand overnight at room temperature. The mass is then filtered and the solid residue recrystallized from hot ethanol. The product has a melting point about 117° C. The assigned structure is confirmed by NMR spectrum analysis.

EXAMPLE F

This example describes the preparatoin of

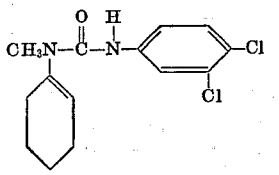

1-(1-cyclohexen-1-yl) - 1 - (methyl) - 3 - (3,4 - dichlorophenyl) urea.

To a solution of 18.8 parts of 3,4-dichlorophenyl isocyanate in toluene maintained at about 15° C. is added about 11.1 parts of N-cyclohexylidene N-methyl amine. An exothermic reaction occurs, and the reaction mixture warms to about 35° C. The reaction mixture is cooled to room temperature and stirred for about 30 minutes. The toluene is stripped off at reduced pressure to recover 22 parts of oily product. The assigned structure is confirmed by NMR spectrum analysis.

Calc'd for $C_{14}H_{16}N_2OCl_2$ (percent): C, 56.2; N, 9.36. Found (percent): C, 55.57; N, 9.36.

EXAMPLE G

This example describes the preparation of

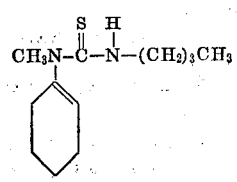

1-(1-cyclohexen-1-yl)-1 - (methyl) - 3 - (n - butyl) - 2-thiourea.

To a solution of 11.5 parts of n-butylisothiocyanate in toluene maintained at about 15° C. is added about 11.1 parts of N-cyclohexylidene N-methyl amine. An exothermic reaction occurs and the reaction mixture warms to about 30° C. The reaction mixture is cooled to room temperature and stirred for about 24 hours. The reaction mixture is then heated to 60° C. for 24 hours. The solvent is stripped off at reduced pressure and the residue is fractionated to recover the product oil. The assigned structure is confirmed by NMR spectrum analysis.

Calc'd for $C_{12}H_{22}N_2S$: N, 12.4; S, 14.15. Found (percent): N, 12.28; S, 14.02.

EXAMPLE H

This example describes the preparation of

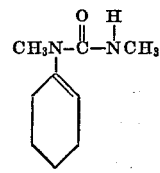

1-(1-cyclohexen-1-yl)-1-(methyl)-3-methyl urea.

To a solution of 8.4 parts of methyl isocyanate in toluene maintained at about 20° C. is added about 15.7 parts of N-cyclohexylidene N-methylamine. An exothermic reaction occurs and the reaction mixture warms to about 35° C. The reaction mixture is cooled to room temperature and stirred for about 2 hours. The solvent is stripped off at reduced pressure to recover the product oil. The assigned structure is confirmed by NMR spectrum analysis. Part of this oil is dissolved in benzene and heated to reflux for 8 hours. The benzene is then stripped off and the product oil recovered. The assigned structure is confirmed by NMR spectrum analysis.

Cal'd for $C_9H_{16}N_2O$: C, 64.3; H, 9.52; N, 16.65. Found: C, 63.14; H, 9.53; N, 16.56.

Following the procedure of the foregoing examples and using the appropriate isothiocyanate and amine reactants, the following 1-(1-cyclohexen-1-yl)thioureas were prepared.

1-(1-cyclohexen-1-yl)-1-(butyl)-3-(methyl)-2-thiourea
1-(1-cyclohexen-1-yl)-1-(hexyl)-3-(allyl)-2-thiourea
1-(1-cyclohexen-1-yl)-1-(allyl)-3-(ethyl)-2-thiourea
1-(1-cyclohexen-1-yl)-1-(n-pentenyl-1)-3-(phenyl)-2-thiourea
1-(1-cyclohexen-1-yl)-1-(methoxypropyl)-3-(m-nitrophenyl)-2-thiourea
1-(1-cyclohexen-1-yl)-1-(ethyl)-3-(2,4-dinitrophenyl)-2-thiourea
1-(1-cyclohexen-1-yl)-1-(ethoxyethyl)-3-(p-chlorophenyl)-2-thiourea
1-(1-cyclohexen-1-yl)-1-(methoxyhexyl)-3-(methyl)-2-thiourea
1-(1-cyclohexen-1-yl)-1-(methyl)-3-(butenyl-1)-2-thiourea
1-(1-cyclohexen-1-yl)-1-(methyl)-3-(p-cyanophenyl)-2-thiourea
1-(1-cyclohexen-1-yl)-1-(methyl)-3-(2,4-dicyanophenyl)-2-thiourea
1-(1-cyclohexen-1-yl)-1-(methyl)-3-(3,4-dicyanophenyl)-2-thiourea
1-(1-cyclohexen-1-yl)-1-(methyl)-3-(m-methylphenyl)-2-thiourea
1-(1-cyclohexen-1-yl)-1-(methyl)-3-[3,4-di(isopropyl)phenyl]-2-thiourea The following examples will illustrate this invention. Parts and percent are by weight unless otherwise indicated.

EXAMPLE 1

A reaction vessel equipped with stirrer, thermometer, and reflux condenser is charged with a solution of 15.3 parts of N-cyclohexylidene N-(n-butyl) amine in carbon tetrachloride and about 20.4 parts of 3,4-dichlorophenyl isothiocyanate are then added slowly with stirring at a temperature of about 20° C. A portion of the reaction mixture is evaporated to remove the solvent and the oily residue is crystallized from hexane. The solid has a M.P.

of 95°–96° C. and nuclear magnetic resonance (NMR) spectrum analysis confirms the structure

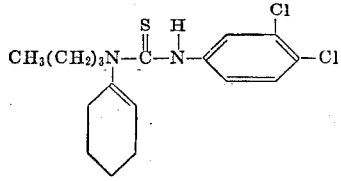

1-(1-cyclohexen - 1 - yl)-1-(n-butyl)-3-(3,4-dichlorophenyl)-2-thiourea.

The remaining portion of reaction mixture containing the above thiourea is heated at reflux for about two hours. The solvent is then stripped off and the solid residue recrystallized from ethyl alcohol. The solid product, M.P. 140–141° C., has the following structure as confirmed by NMR spectrum analysis

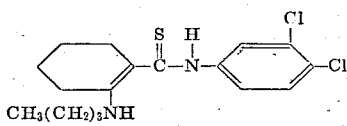

[2-(n-butylamino)-1-cyclohexen - 1 - yl]-3',4'-dichlorothioanilide.

The analysis for this thioanilide is as follows:

Cal'd for $C_{17}H_{22}N_2SCl_2$: C, 57.2; H, 6.26; N, 7.85; S, 8.96. Found: C, 57.32; H, 6.21; N, 7.78; S, 9.08.

EXAMPLE 2

To a reaction vessel equipped with stirrer, thermometer, and reflux condenser containing 10.4 parts of N-cyclohexylidene N-dodecyl amine in carbon tetrachloride is added slowly with stirring about 8.1 parts of 3,4-dichlorophenyl isothiocyanate. An exothermic reaction increases the temperature to about 30° C. The reaction mixture is cooled to about 30° C. and stirred for about 2½ hours. A portion of the reaction mixture is evaporated to remove the solvent and the oily residue is crystallized from ethyl alcohol. The solid, M.P. 47–49° C., has the following structure as confirmed by NMR spectrum analysis

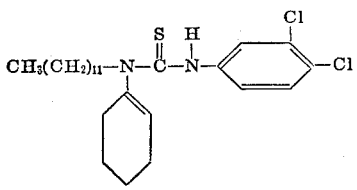

1-(dodecyl) - 1 - (1-cyclohexen-1-yl)-3-(3,4-dichlorophenyl)-2-thiourea.

The remaining portion of reaction mixture containing the above thiourea is heated at reflux for about 2 hours and then the solvent is stripped off. The solid residue is recrystallized from ethyl alcohol. The solid product, M.P. 47–49° C., has the following structure as confirmed by NMR spectrum analysis.

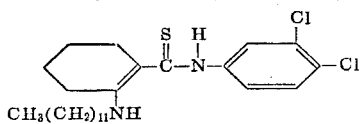

[2 - (dodecylamino) - 1 - cyclohexen-1-yl]-3',4'-dichlorothioanilide.

Analysis of the thioanilide product is as follows:

Calc'd for $C_{25}H_{38}N_2SCl_2$: C, 64.0; H, 8.11; N, 5.97; Cl, 15.15; S, 6.83. Found: C, 63.79; H, 8.07; N, 6.00; Cl, 14.82; S, 6.63.

EXAMPLE 3

To a reaction vessel equipped with stirrer, thermometer, and reflux condenser containing 10.3 parts of N-cyclohexenidene N-methyl amine in carbon tetrachloride is added slowly with stirring about 19.1 parts of 3,4-dichlorophenyl isothiocyanate. An exothermic reaction increases the temperature to about 30° C. The reaction mixture is cooled to about 25° C. and stirred for about 3½ hours. The toluene is removed by evaporation under reduced pressure to recover a crystalline solid having a melting point of 107–108° C. and the following structure as confirmed by NMR spectrum analysis

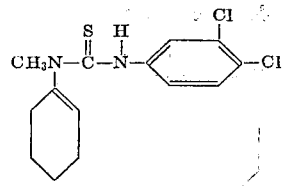

1 - (methyl) - (1 - cyclohexen - 1 - yl) - 3 - (3,4 - dichlorophenyl)-2-thiourea. The solid crystals of the above thiourea are heated at 80° C. in benzene and then recrystallized by cooling to room temperature to recover the product thioanilide. The solid product has a melting point of 160–161° C. and the following structure as confirmed by NMR spectrum analysis

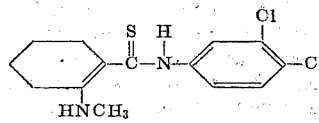

[2 - (methylamino) - 1 - cyclohexen - 1 - yl] - 3',4'-dichlorothioanilide.

Analysis of thioanilide product is as follows:

Calc'd for $C_{14}H_{16}N_2SCl_2$: C, 53.4; H, 5.08; N, 8.9; Cl, 22.5; S, 10.15. Found: C, 53.37; H, 4.99; N, 8.78; Cl, 22.54; S, 10.14.

EXAMPLES 4 THROUGH 11

Following the procedure of the foregoing examples and using the appropriate reactants, the following thioanilides are prepared.

Example:
 4 [2-(methylamino)-1-cyclohexen-1-yl]-2',4'-dinitrothioanilide
 5 [2-(ethylamino)-1-cyclohexen-1-yl]p-cyanothioanilide
 6 [2-(propylamino)-1-cyclohexen-1-yl]-p-cyanothioanilide
 7 [2-(octylamino)-1-cyclohexen-1-yl]-2',4'-dicyanothioanlide
 8 [2-(isobutylamino)-1-cyclohexen-1-yl]-p-cyanothioanilide
 9 [2-(ethylamino)-1-cyclohexen-1-yl]-2',4',6'-trichlorothioanilide
 10 [2-(propylamino)-1-cyclohexen-1-yl]-3',5'-dichlorothioanilide
 11 [2-(dodecylamino)-1-cyclohexen-1-yl]-p-cyanothioanilide
 12 [2-(methylamino)-1-cyclohexen-1-yl]-p-cyanothioanilide
 13 [2-(octadecylamino)-1-cyclohexen-1-yl]-p-cyanothioanilide The [2 - (lower alkylamino) - 1-cyclohexen-1-yl]-mono cyano substituted thioanilides are particularly useful in the control of the soil fungus *Rhizoctonia solani*, for example at a concentration of 30 p.p.m. a complete kill thereof was observed employing [2-(methylamino)-1-cyclohexen-1-yl]-p-cyanothioanilide

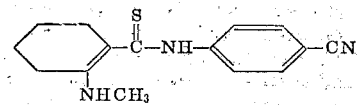

a yellow solid melting at 157–160° C.

The embodiments of the invention in which an exclusive property or privilege is claimed are defined as follows:

1. Compound of the formula

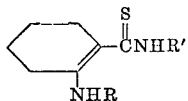

wherein R is alkyl having from 1 to 18 carbon atoms and R' is cyano substituted aryl which is selected from the group consisting of phenyl, naphthyl and biphenyl, respectively substituted with from 1 to 2 cyano substituents.

2. Compound of claim 1 wherein R' is cyanophenyl.
3. Compound of claim 2 wherein R' is p-cyanophenyl.
4. Compound of claim 2 wherein R is lower alkyl.
5. Compound of claim 3 wherein R is lower alkyl.
6. Compound in accordance with claim 2 which is

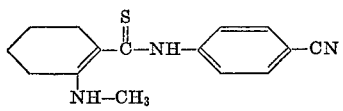

7. Process for the preparation of cyano substituted thioanilides of the formula

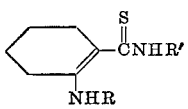

wherein R is alkyl having from 1 to 18 carbon atoms and R' is cyano substituted aryl which is selected from the group consisting of phenyl, naphthyl and biphenyl, respectively substituted with from 1 to 2 cyano substituents which comprises heating a urea of the formula

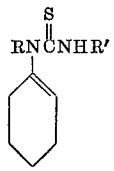

wherein R and R' are as defined above at a temperature above 35° C.

References Cited
UNITED STATES PATENTS 3,101,373  8/1963  McKay et al. _____ 260—55 X
3,125,432  3/1964  Todd _____ 260—465 X FLOYD D. HIGEL, Primary Examiner U.S. Cl. X.R.

71—105; 204—14 R; 424—304; 252—8.1, 83, 308, 355, 390; 260—551 R, 552 R, 553 R, 556 R, 999